United States Patent [19]

Risi

[11] Patent Number: 4,731,136

[45] Date of Patent: Mar. 15, 1988

[54] PROCESS FOR RECYCLING USED TIRES

[75] Inventor: Leandro Risi, S. Michele in Escheto/Lucca, Italy

[73] Assignee: T.R.S. Tyres Recycling System S.A., Grono, Switzerland

[21] Appl. No.: 760,655

[22] Filed: Jul. 30, 1985

[30] Foreign Application Priority Data

Feb. 11, 1985 [CH] Switzerland .......................... 842/85

[51] Int. Cl.$^4$ ...................... B60C 21/00; B29C 35/00
[52] U.S. Cl. ........................................ 156/64; 73/146; 156/87; 156/97; 156/124; 156/129; 156/154; 156/244.19; 156/244.23; 156/244.24; 157/13; 264/36; 264/40.1; 264/278; 346/33 F; 356/347; 358/106; 358/347
[58] Field of Search ...................... 156/97, 96, 124, 64, 156/87, 129, 154, 244.19, 244.23, 244.24; 157/13; 264/36, 40.1, 278; 425/123, 812; 73/146; 152/526, 532, 535, 536; 346/33 F; 356/347; 358/106, 347; 249/141

[56] References Cited

U.S. PATENT DOCUMENTS

| | | | |
|---|---|---|---|
| 2,421,097 | 5/1947 | Lakso | 156/97 X |
| 3,154,985 | 11/1964 | Hermanns | 156/87 X |
| 4,036,677 | 7/1977 | Marangoni | 156/96 X |
| 4,202,394 | 5/1980 | van der Burg | 152/535 X |
| 4,258,776 | 3/1981 | Walters et al. | 156/96 X |
| 4,392,745 | 7/1983 | Wright et al. | 356/348 |
| 4,415,013 | 11/1983 | Vine | 156/97 X |
| 4,424,088 | 1/1984 | Durie | 156/97 X |
| 4,447,197 | 5/1984 | Bartley et al. | 249/141 X |
| 4,490,197 | 12/1984 | Bajer | 156/96 X |
| 4,506,981 | 3/1985 | Hoff, Jr. | 356/347 |

Primary Examiner—Donald E. Czaja
Assistant Examiner—Thomas Bokan
Attorney, Agent, or Firm—Young & Thompson

[57] ABSTRACT

The present process allows recycling used tires which are at present considered to be no longer suitable for restructuring according to known processes.

According to the invention a preliminary control is carried out, also by scanning by means of a laser, to assess the seriousness of the internal ruptures and deformations due to impacts or other causes, discarding tires which are too damaged, while the thread and the metallic belts of the remaining tires which can be used are removed therefrom by scraping, the entire tire assembly being reconstructed, by vulcanizing before mounting the tread, and checking again with the laser to detect bubbles or other defects correcting the defects, obtaining a perfect assembly (FIG. 25) on which the tread which is vulcanized again, is lastly mounted.

4 Claims, 47 Drawing Figures

PROCESS FOR RECYCLING USED TIRES

The present invention has as its object a process for recycling used tires.

It differs substantially from the known recycling processes which are essentially based on removing lacerated or defective parts and subsequent restructuring and vulcanization.

The present process is particularly well suited to recycling truck tires having a radial structure, which are not considered to be suitable for traditional reconstruction or other known techniques.

The enclosed drawings show a preferred embodiment which is non-exhaustive and not binding, of the various operational control, restructuring and reconstruction phases according to the present process.

FIGS. 12 to 21d show the first phases of the restructuring operation.

FIGS. 22 to 25 and 28a to 29b show the vulcanization phases in the restructuring operation.

FIGS. 31a and 31b show the mounting phases of the tread.

FIGS. 32a, 32b, 33a, 33b and 34 represent other embodiments.

Figures 1, 3:
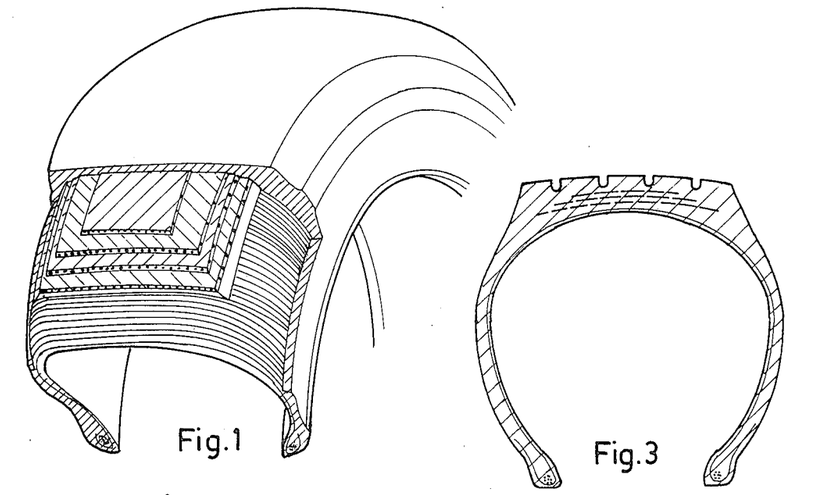
FIG. 1 shows a truck tire of the radial type with a metallic structure.
FIG. 3 shows a known technique for reconstructing tires.
Figures 2, 4, 5:
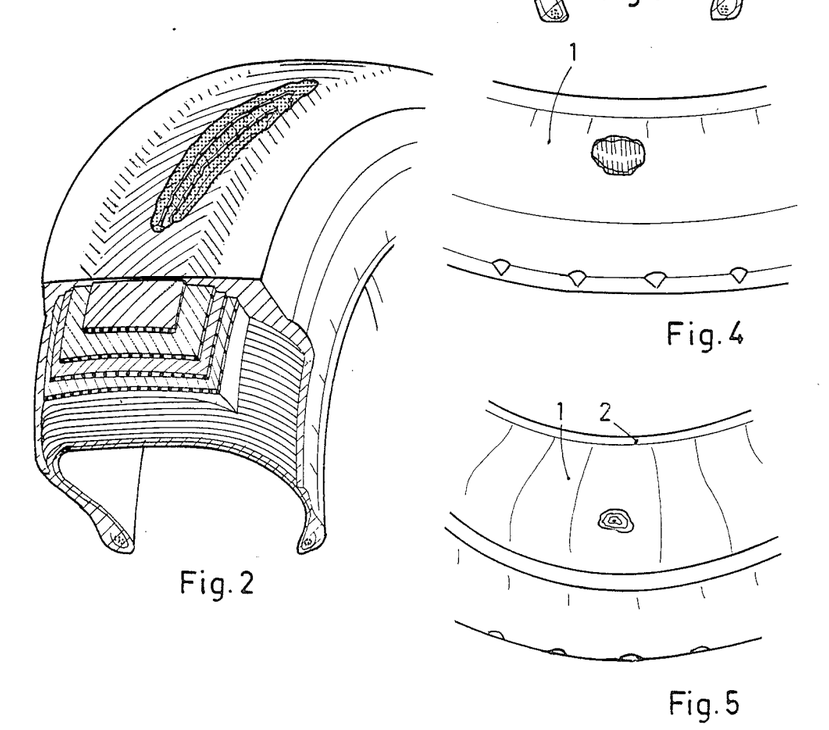
FIG. 2 shows the same tire after a deterioration such that it is no longer suitable for reconstruction according to present known techniques, that is, no longer able to be restructured according to FIG. 3.
FIGS. 4 to 7 show other types of ruptures or defects which are considered irreparable at present.

The novelty of the present invention consists in that a radial tire with a metallic structure for example for a truck, (FIG. 1) which underwent such deterioration while in use as to be no longer suitable (FIG. 2) for traditional reconstruction (FIG. 3), and therefore is considered worn out, can be restructured according to the present process. The present process is characterized by the following subsequent operations:
  control of the condition of the used tire;
  restructuring and
  reconstruction.

The control operation comprises the following phases:

($a_1$) visual control, at the place where the used tire is located, to ascertain that the carcass does not have irreparable ruptures.

A radial tire with a metallic structure, is visually inspected to ascertain that the radial body 1 does not have lacerations (FIG. 2), ruptures of radial chords (FIG. 4) etc., and that the bead 2 (FIG. 5) does not have cracks or gaps.

Figure 6:
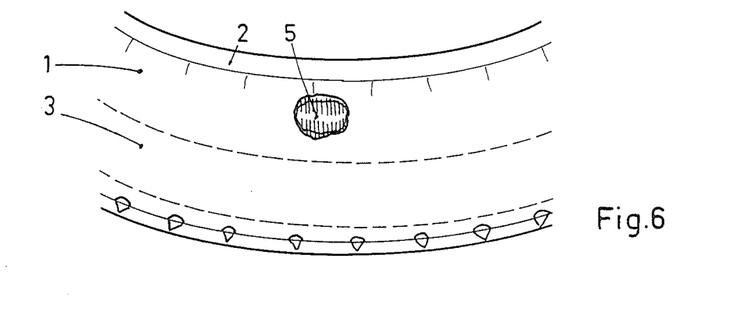
Figure 7:
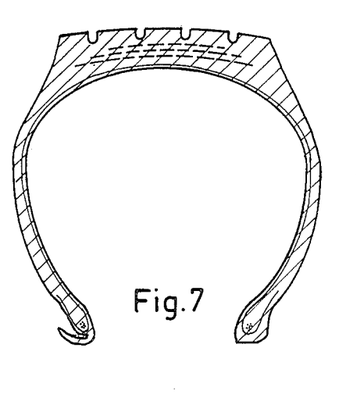

($b_1$) Control, in the restructuring apparatus, by means of a divaricator or suitable inspection means, to examine the condition inside the tire and the bead 2 (FIG. 5), discarding tires with broken cords 5 (FIG. 6), cracks or gaps near the bead, as well as tires having a predetermined number of broken cords on the body 1, 3.

Figure 8A:
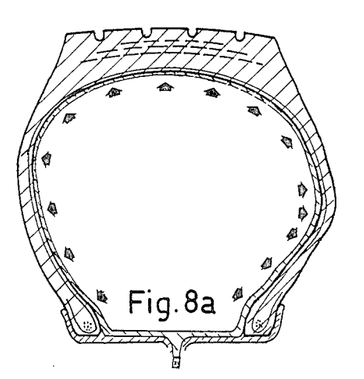
FIGS. 8a, 8b and 8c show anomalies which arise when subjecting a tire to be restructured to a pressure which is higher than the operating pressure.
Figure 27:
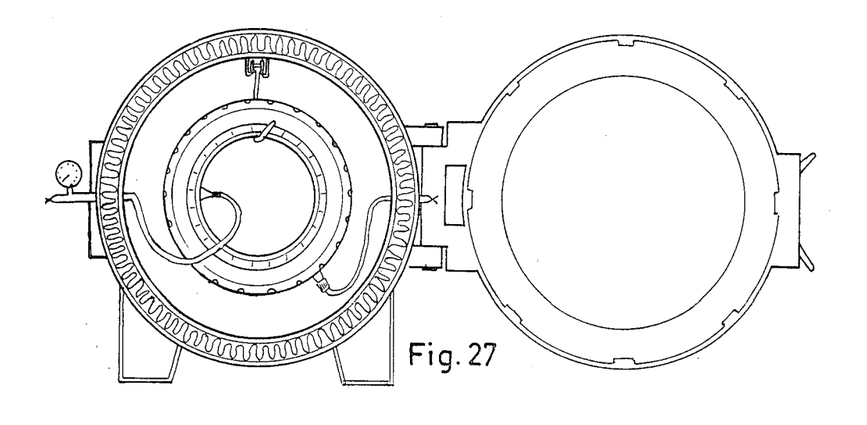
FIG. 27 shows an apparatus for controlling the tire after vulcanization.

($c_1$) Control by pumping up the tire between two flanges (FIG. 27) at a higher-than-normal pressure, for example higher than 2 kg/cm$^2$ inside a sealed iron-clad chamber in order to detect possible deformations (FIG. 8a), especially on the sides, due to striking curbs.

Figure 8B:
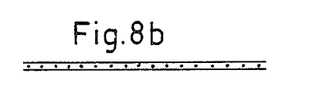
Figures 8C, 9:
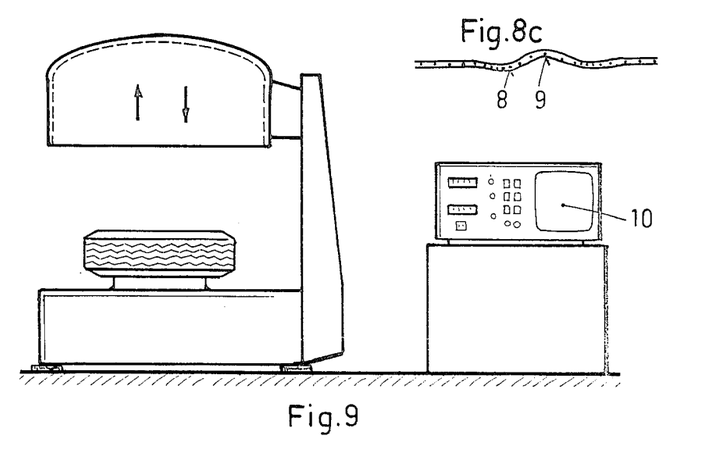
FIG. 9 shows an apparatus which allows the control, by means of a laser, from bead to bead (FIG. 10) of a tire to be restructured in order to show clearly all the defects.

These anomalies are clearly visible in the form of notches 8 (FIGS. 8b and 8c) followed by projections 9, which can be detected only by said test; obviously the apparatus with which this test is performed is provided with a protection screen for the operator carrying out the control through an iron-clad protective glass.

Figure 10:
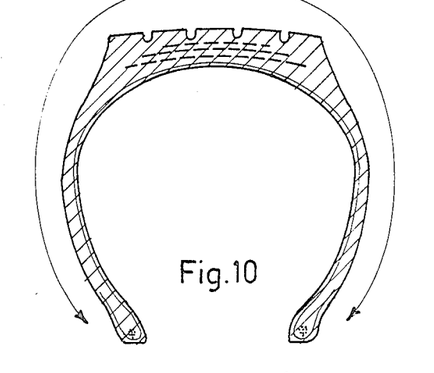
FIG. 10 shows a tire so controlled.
Figure 11:
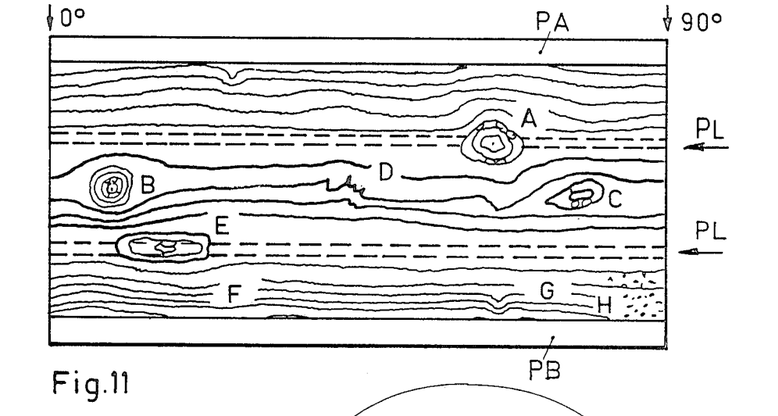
FIG. 11 shows the result of the scanning carried out with the laser.

($d_1$) Control carried out by means of a laser (FIGS. 9, 10, 11) adapted to check the structure from bead to bead (FIG. 10). It allows ascertaining whether a tire which was previously controlled and in which no such internal or external anomalies were found that could prevent a possible restructuring, is suitable or unsuitable, by means of an oleographic and sherographic (section-by-section scan) test, shown on the monitor 10 of the apparatus of FIG. 9 and, as a consequence, photographed according to FIG. 11, in which PA indicates the upper part of the bead, PB the bottom part of the bead and PL the sole edges. The function of said laser control is not limited to show anomalies at any point of the body, but it also indicates and determines:
  the consistency of the necessary restructuring;
  the estimated restructuring cost;
  the report on a schedule, in code language, of the restructuring program.

($e_1$) Preparation of a schedule as mentioned above relating to the restructuring program, and calculating the total restructuring cost.

($f_1$) Selecting the suitable tires from the unsuitable ones by means of these control phases, without working at all on tires which have not passed the test mentioned above.

The restructuring operation

Restructuring, which is the object of the invention, is based on the fact that the tire is an assembly of parts positioned one on top of another which might have been completely or partly removed.

It includes the following successive phases:

($a_2$) Removal of the tread of the tire to be restructured, of possible metallic belts and any other extraneous body. Starting by scraping the tire by means of removing the residual part of the tread and possible metallic belts and ending with removing any other extraneous body.

Figure 12:
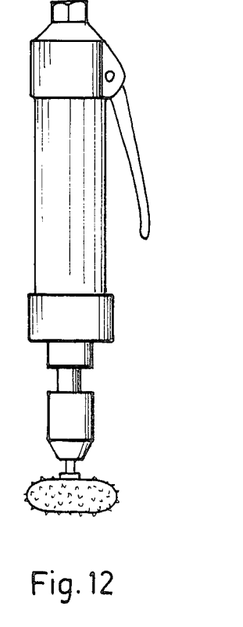
Figure 13:
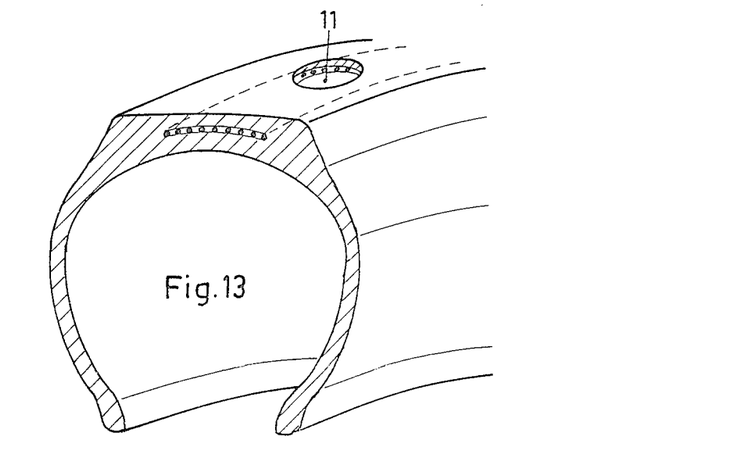

($b_2$) Forming craters 11 (FIG. 13) at points where there are splits, partial oxidations, lacerations due to striking against blunt objects and other damaged or contaminated parts, at the different levels by means of the scraping apparatus shown in FIG. 12.

Figures 14, 15, 16A, 16B, 17:
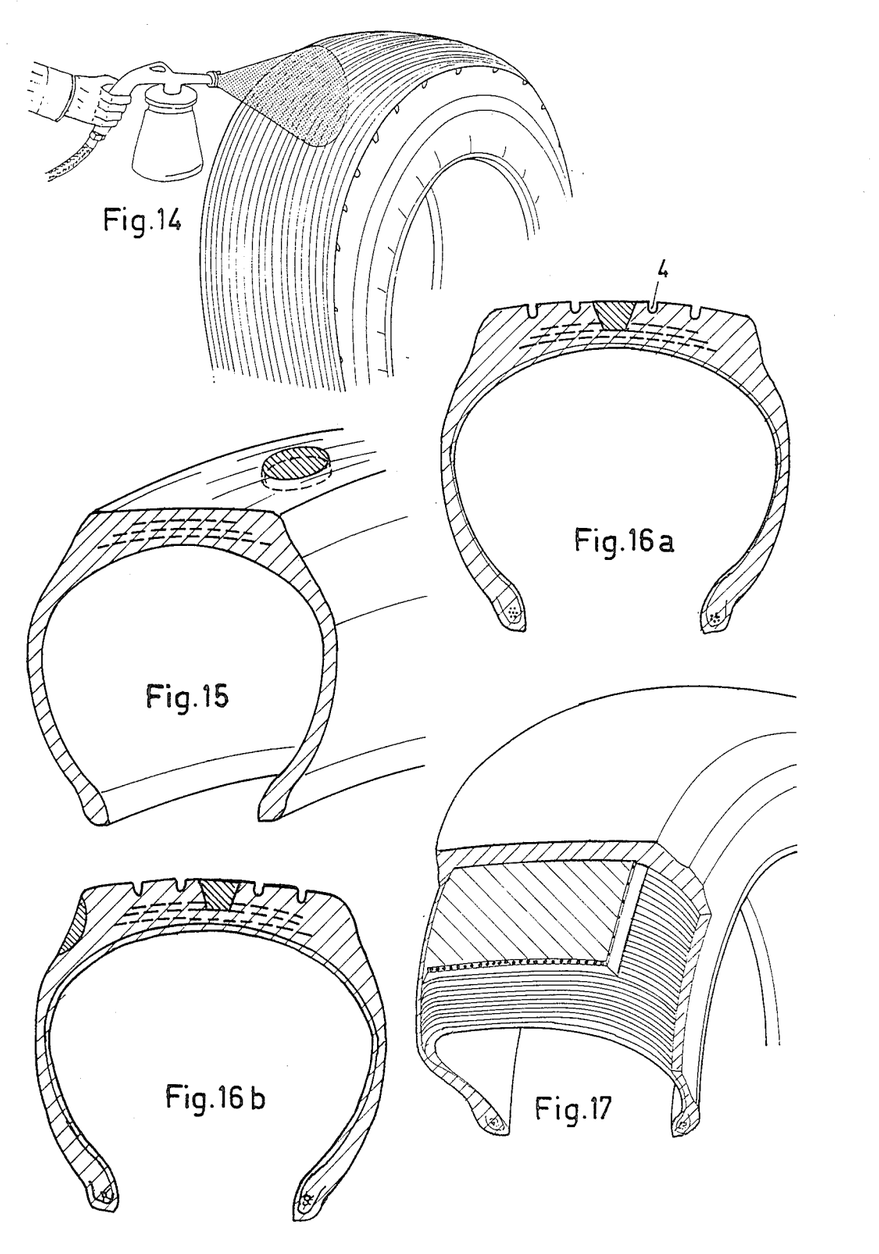

($c_2$) Spraying a rubber-solvent mixture on all the parts that need to be restructured (FIG. 14).

Figure 34:
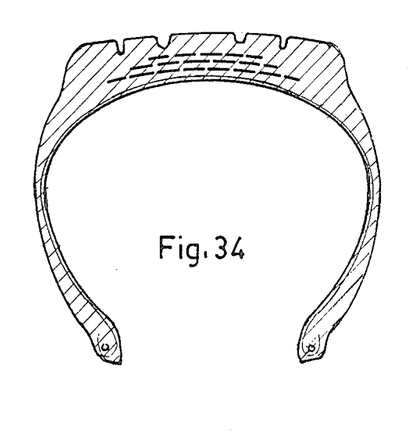

($d_2$) Filling the craters by means of a mini-extruder with a mixture of non-vulcanized rubber to restore the smooth surface on the entire area to be restructured, including the sides (FIGS. 15, 16a, 16b). The grooves 4 (FIG. 16a) do not constitute the tread, but they have the function of retaining better the tread during the subsequent vulcanization phase (f₂) (see also FIG. 34).

Figures 18, 19, 20, 20A, 20C:
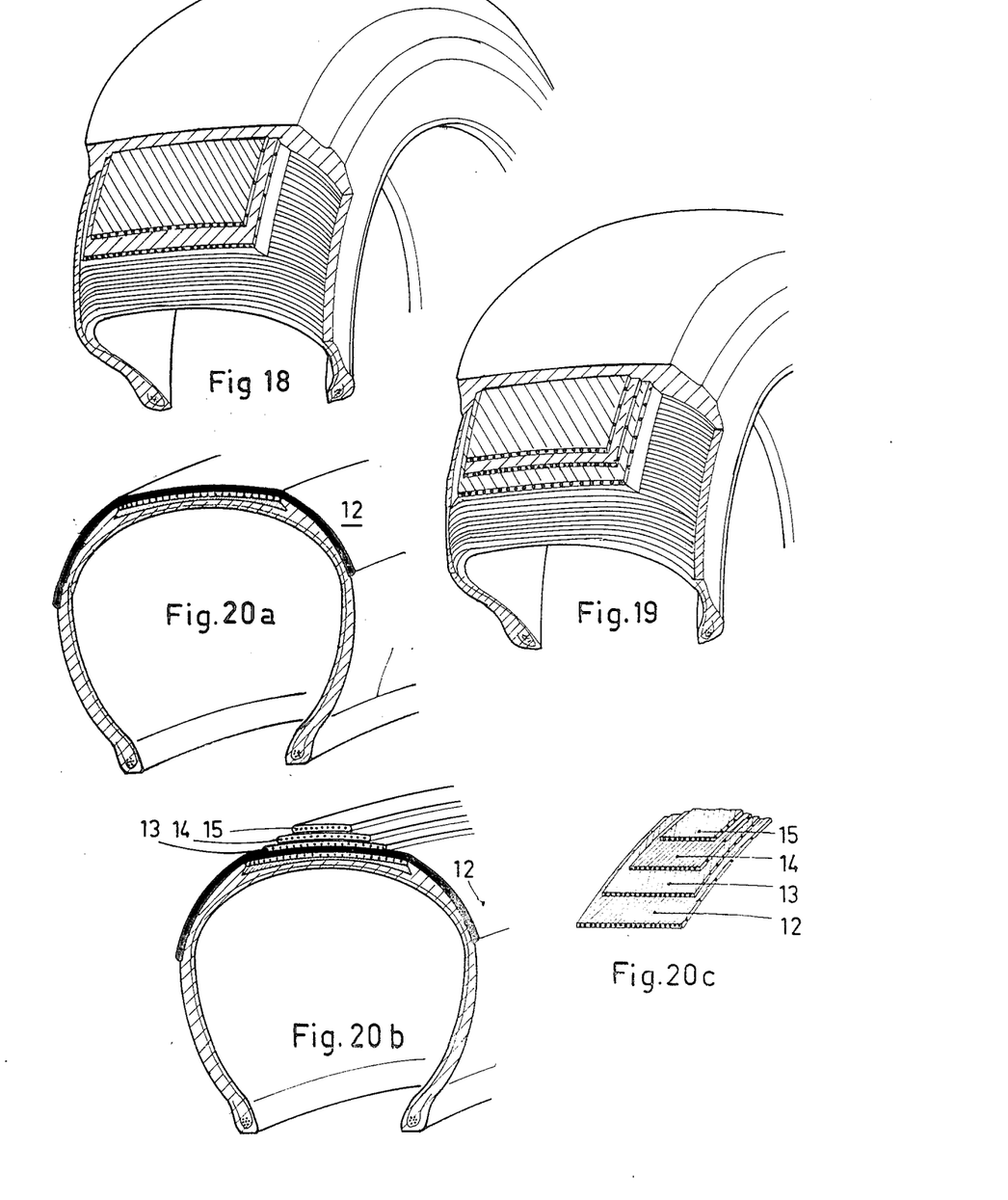
Figures 21A, 21B, 21C, 21D, 22, 23, 24:
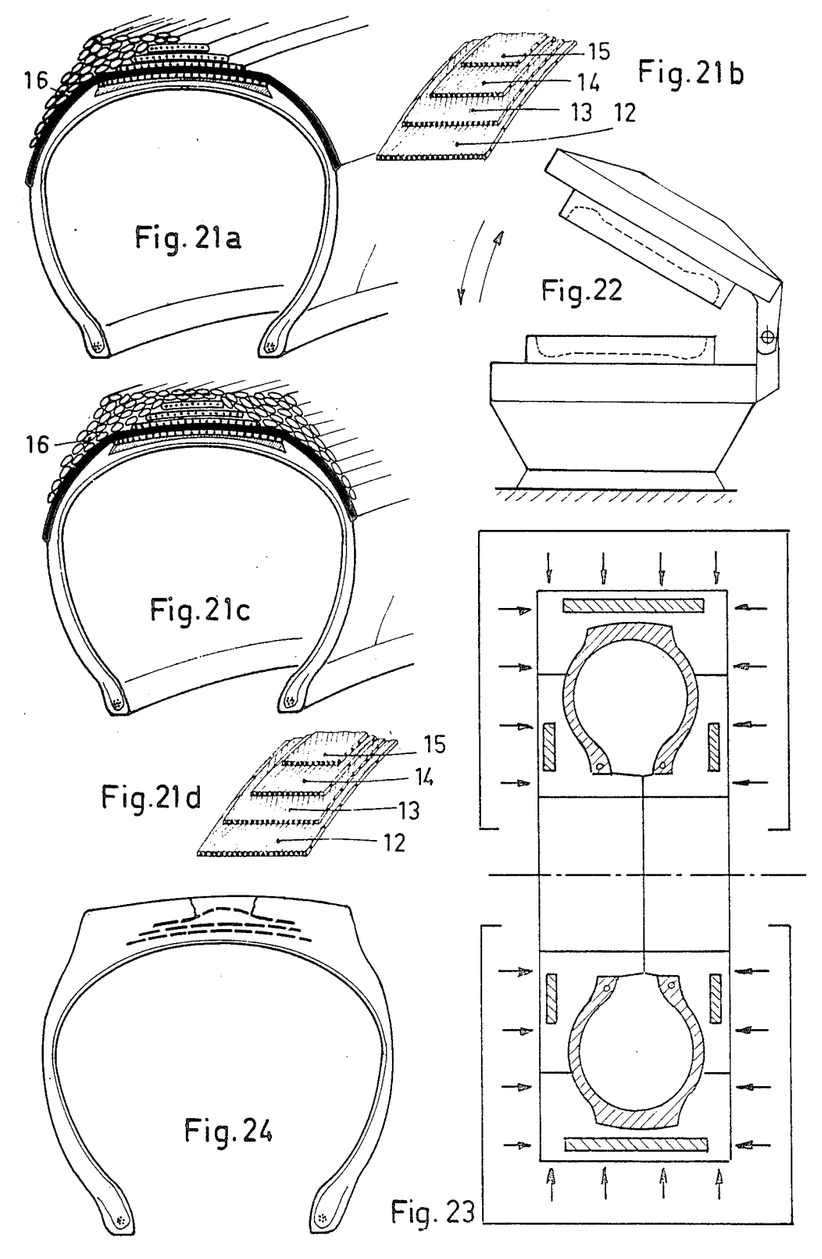

(e₂) Subsequent mounting of:
a first rubber sheet 12 (FIG. 20a) to obtain the original radial structure of the tire;
a first metallic belt 13 (FIGS. 17, 20b, 20c);
a second metallic belt 14 (FIGS. 18, 20b, 20c) with interposition of possible connecting sheets/layers;
a third metallic belt 15 (FIGS. 19, 20b and 20c);
a layer of non-vulcanized rubber 16 (FIGS. 21a, 21b, 21c, 21d) from one side to the other of the tire which completely covers the metallic belts, and in the amount required by the size of the matrix having a smooth surface in which the tire is subsequently positioned for vulcanization.

Figure 28A:
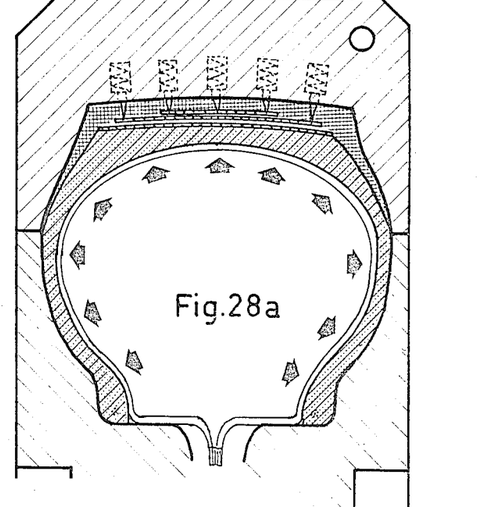
Figure 28B:
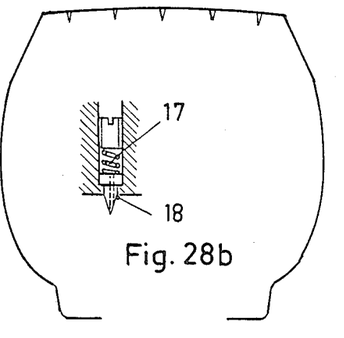

(f₂) Vulcanization in a press (FIG. 22) provided with a punch (FIG. 23) having a smooth surface that is, without any projections or indentations, by providing rows of adjustable sensors 17, 18 (FIGS. 28a, 28b) positioned longitudinally along the entire periphery of the tread, said sensors being provided with tips 18 adapted to hold the metallic belts 13, 14, 15 thereby preventing their movement during vulcanization. Said tips are axially pierced and engaged by elastic devices 17 which allow their automatic retraction during vulcanization by letting the air or gases flow freely out through said internal holes.

Figure 26:
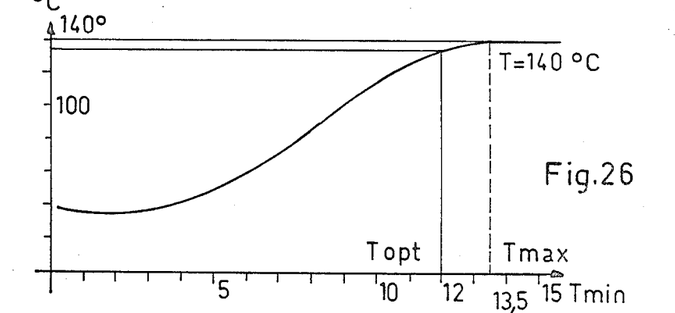
FIG. 26 shows the temperature-time (in minutes) diagram of the vulcanization phase.

Vulcanization occurs by heating at a temperature of 140° C. in the matrix or press, by means of circulation of saturated vapor and for a period of time between 12 and 15 minutes (see diagram of FIG. 26).

It is not excluded that the period of time can be extended up to a maximum of 25 minutes.

The automatic retraction of the tips is carried out by means of a grooved ring (not shown), controlled by a timer, which by rotating angularly positions its grooves in correspondence to the back of the tips, allowing their retraction by expansion of the springs.

(g₂) Control of the correct vulcanization by means of a laser to check the possible existence of air bubbles between the replaced parts (FIG. 24) which would cause the gradual separation of the bundle of layers applied. In case there are air bubbles, a crater 22 (FIG. 29a) and a subsequent filling with vulcanized rubber (FIG. 29b) are carried out, thereby obtaining a perfect assembly (FIG. 25) having no tread.

Figure 29A:
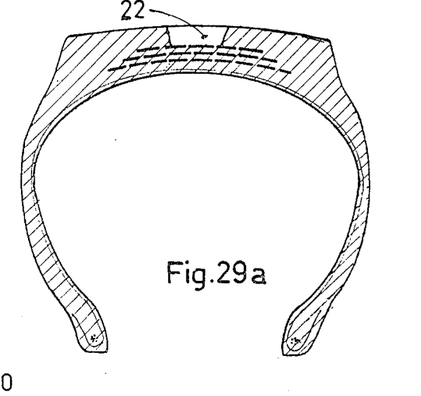
Figure 29B:
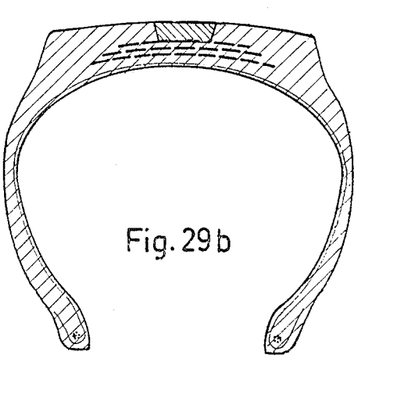
Figure 31A:
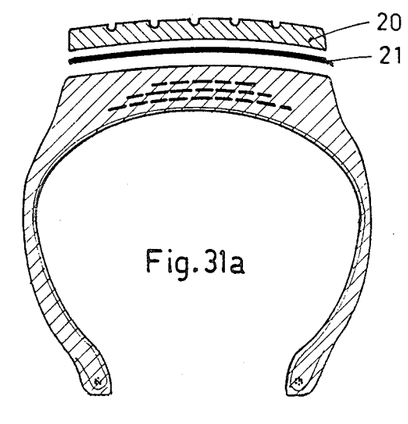

The main characterizing fact of the present invention is that the anomalies which can be clearly seen after vulcanization can be removed without damaging the external appearance of the tire, as this is still without tread (FIG. 29a). In effect, said anomalies are corrected by reaching the affected area with an abrasive tool, by removing or reestablishing the conditions provided for by restructuring, constituting a crater 22 which is in turn filled with non-vulcanized rubber (FIG. 29b) or press-vulcanized rubber in the reconstruction phase. In this manner, a perfectly restructured assembly (FIG. 25) is obtained which is adapted to be fitted with the tread (FIG. 31a).

Figure 30:
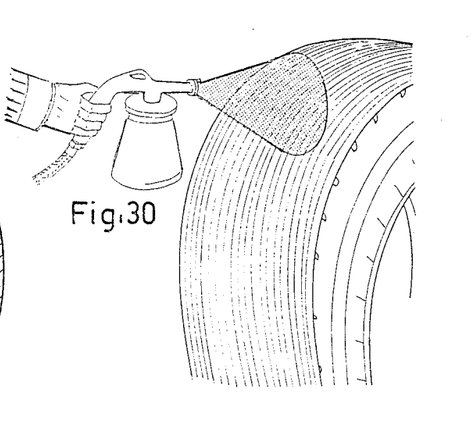
FIGS. 30, 31a, 32a refer to the reconstruction phase.
Figure 31B:
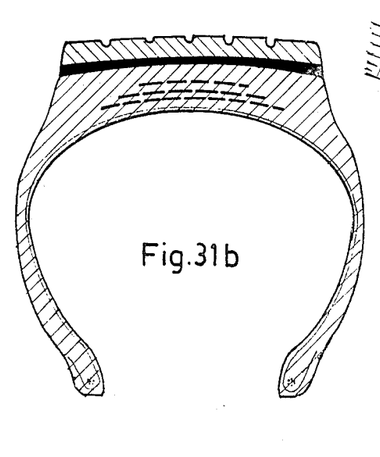
Figure 32A:
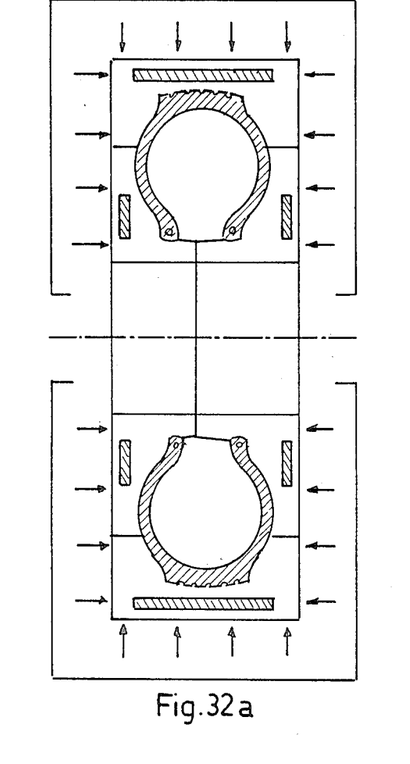
Figure 32B:
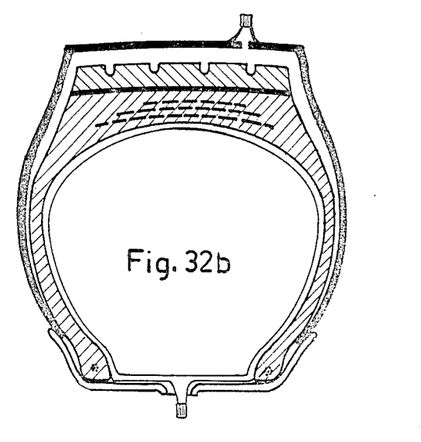

The reconstruction operation comprises the following phases:

(a₃) Brushing the entire periphery of the tire in view of mounting the tread;

(b₃) Spraying a rubber-solvent solution (FIG. 30);

(c₃) Mounting a sheet of non-vulcanized rubber 21 (FIG. 31a) for joining with a pre-punched band 20 used as a tread (FIG. 31b);

(d₃) vulcanization (FIGS. 32a, 32b).

Figure 25:
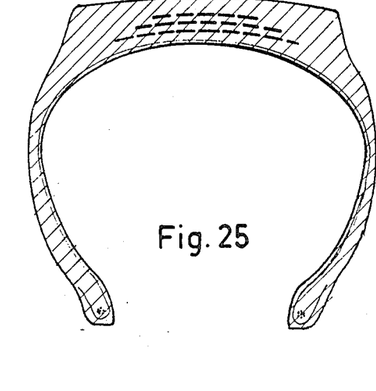
Figure 33A:
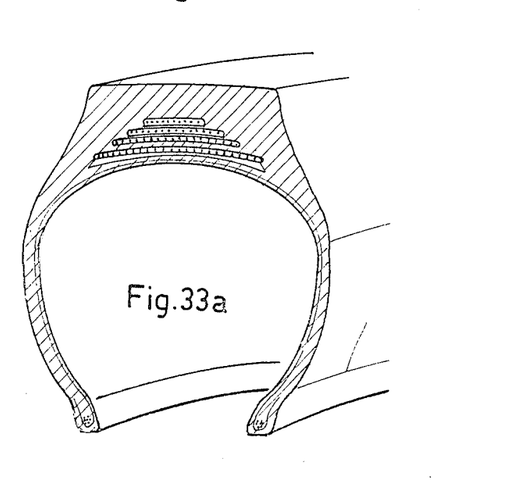
Figure 33B:
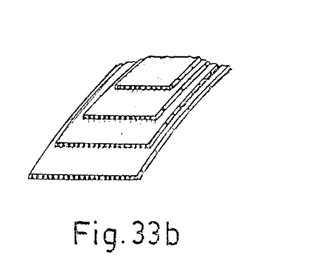

In FIGS. 33a and 33b a different form of the restructured assembly according to FIG. 25 is shown.

I claim:

1. Process for recycling used tires comprising: control of the condition of the used tire; restructuring; and reconstruction; wherein control comprises the following stages:

(a₁) visual control by inspection of the used tire to ascertain that the body does not have irreparable ruptures;

(b₁) using an inspection device to check the condition inside the tire and the bead of said tire, discarding tires having broken cords, cracks or gaps near the bead or having a predetermined number of broken cords on the body;

(c₁) placing the tire between two flanges inside a sealed chamber and pumping up the tire to a higher than normal pressure in order to detect pressure deformations;

(d₁) using a laser to check the structure of the tire from bead to bead;

(e₁) setting-up a schedule for the restructuring program and calculating a total restructuring cost; and (f₁) selecting suitable tires from unsuitable ones; and wherein restructuring comprises the following stages:

(a₂) removing the tread of the tire, metallic belts and any extraneous body;

(b₂) forming craters at places where there are damaged and contaminated parts including splits, partial oxidations, and lacerations due to striking against blunt objects at all layers of the tire;

(c₂) spraying a rubber-solvent mixture on all parts to be restructured;

(d₂) filling the craters with a mixture comprising non-vulcanized rubber to restore a smooth surface along the entire area to be restructured including the sides;

(e₂) subsequently mounting on the tire:
a first rubber sheet to obtain the original radial structure of the tire;
a first metallic belt;
a second metallic belt;
a third metallic belt; and
a layer of non-vulcanized rubber completely covering all said metallic belts and in an amount required by the dimensions of a matrix having a smooth surface in which said tire is subsequently to be positioned for vulcanization;

(f₂) vulcanization in a press provided with a punch having a smooth surface, wherein rows of adjustable sensors are positioned longitudinally along the entire periphery of the tread, said sensors being provided with tips adapted to hold the metallic belts during vulcanization, said tips being internally pierced and engaged by elastic devices which allow their automatic retraction during vulcanization by letting air and gases flow freely out through internal holes;

(g₂) using a laser to detect possible existence of air bubbles between replaced parts, wherein at the location of any detected air bubbles a crater is formed and subsequently filled with vulcanized rubber so as to obtain a perfect tire assembly having no tread;
and reconstruciton comprises the following stages:
   (a₃) brushing the entire periphery of the tire;
   (b₃) spraying the tire with a rubber-solvent solution;
   (c₃) applying a sheet of non-vulcanized rubber for joining with a prepunched band, said sheet of non-vulcanized rubber to be used as a tread; and
   (d₃) vulcanizing the tire.

2. Process according to claim 1 wherein control stage (d₁) comprises a holographic and sherographic (section-by-section scanning) test shown on a monitor and photographed.

3. Process according to claim 1, wherein restructuring phase (a₂) comprises scraping.

4. Process according to claim 1, wherein the provision of craters in restructuring phases (b₂) and (g₂) comprises scraping by means of a scraping tool.

* * * * *